(12) United States Patent
Kageyama

(10) Patent No.: US 10,204,742 B2
(45) Date of Patent: Feb. 12, 2019

(54) VARIABLE CAPACITANCE ELEMENT

(71) Applicant: Murata Manufacturing Co., Ltd., Nagaokakyo-shi, Kyoto-fu (JP)

(72) Inventor: Keisuke Kageyama, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 15/686,272

(22) Filed: Aug. 25, 2017

(65) Prior Publication Data

US 2017/0352489 A1 Dec. 7, 2017

Related U.S. Application Data

(63) Continuation of application No. PCT/JP2016/055339, filed on Feb. 24, 2016.

(30) Foreign Application Priority Data

Feb. 27, 2015 (JP) ................. 2015-039341
Apr. 16, 2015 (JP) ................. 2015-084439

(51) Int. Cl.
*H01G 7/06* (2006.01)
(52) U.S. Cl.
CPC ................... *H01G 7/06* (2013.01)
(58) Field of Classification Search
USPC ................................... 361/281
See application file for complete search history.

(56) References Cited

U.S. PATENT DOCUMENTS

| 6,822,276 B1* | 11/2004 | Torii ............... H01L 28/75 257/295 |
| 2010/0014213 A1 | 1/2010 | Wozniak et al. |
| 2011/0163827 A1* | 7/2011 | Kanno ............... H01G 4/255 333/185 |
| 2016/0172114 A1 | 6/2016 | Kageyama |

FOREIGN PATENT DOCUMENTS

| JP | 06-314602 A | 11/1994 |
| JP | 10-223475 A | 8/1998 |
| JP | 11-274000 A | 10/1999 |
| JP | 2006-245367 A | 9/2006 |
| JP | 2006-347782 A | 12/2006 |
| JP | 2009-513006 A | 3/2009 |
| JP | 2010-215430 A | 9/2010 |
| JP | 2011-101041 A | 5/2011 |
| JP | 2013-536989 A | 9/2013 |
| WO | 2015/030170 A1 | 3/2015 |

OTHER PUBLICATIONS

Official Communication issued in International Patent Application No. PCT/JP2016/055339, dated May 17, 2016.
Kageyama, "Variable Capacitance Element", U.S. Appl. No. 15/686,276, filed Aug. 25, 2017.
Official Communication issued in Japanese Patent Application No. 2017-502404, dated Oct. 30, 2018.

* cited by examiner

*Primary Examiner* — Michael P McFadden
(74) *Attorney, Agent, or Firm* — Keating & Bennett, LLP

(57) ABSTRACT

A variable capacitance element includes a variable capacitance layer made of a dielectric material, an electrode to obtain electrostatic capacitance in the variable capacitance layer, insulating elements that face each other via the variable capacitance layer, and a lead element extending from the electrode, wherein the insulating elements are made of an insulating material which contains Sr and at least one of Ti and Zr.

14 Claims, 5 Drawing Sheets

VARIABLE CAPACITANCE ELEMENT

CROSS REFERENCE TO RELATED APPLICATIONS

This application claims the benefit of priority to Japanese Patent Application No. 2015-039341 filed on Feb. 27, 2015 and Japanese Patent Application No. 2015-084439 filed on Apr. 16, 2015, and is a Continuation application of PCT Application No. PCT/JP2016/055339 filed on Feb. 24, 2016. The entire contents of each application are hereby incorporated herein by reference.

BACKGROUND OF THE INVENTION

1. Field of the Invention

The present invention relates to a variable capacitance element.

2. Description of the Related Art

A known variable capacitance element has a capacitance that is varied by changing a permittivity of a dielectric layer by an applied voltage.

For example, Japanese Laid-Open Patent Publication No. 2011-101041 discloses a variable capacitance element including dielectric layers and electrodes alternately laminated so that the electrodes are formed into a comb shape. However, a variable capacitance element including electrodes formed into a comb shape as described in Japanese Laid-Open Patent Publication No. 2011-101041 has an increased stray capacitance due to an electrode structure thereof and it is not easy to make a capacitance variable rate larger.

In order to solve the problem of the stray capacitance, International Publication No. 2015/030170 discloses a variable capacitance element including a variable capacitance layer formed of a dielectric material, a pair of electrodes that face each other via the variable capacitance layer, a pair of insulating elements supporting the variable capacitance layer therebetween via the pair of electrodes, and a pair of lead elements respectively connected to the pair of electrodes, wherein the pair of lead elements are respectively disposed inside the pair of insulating elements, and the pair of lead elements are provided on a same axis perpendicular or substantially perpendicular to the variable capacitance layer. Since, in such variable capacitance element, the lead element is provided on an axis approximately perpendicular to the variable capacitance layer, the stray capacitance is suppressed.

In the variable capacitance element described in Example 2 of International Publication No. 2015/030170, as the variable capacitance layer and the insulating part, a dielectric material ($\varepsilon r=2000$) consisting of $(Ba_{0.6}Sr_{0.4})TiO_3$ is used. In the variable capacitance element described in Example 3, as the variable capacitance layer, the same dielectric material consisting of $(Ba_{0.6}Sr_{0.4})TiO_3$ as that described above is used, and as the insulating part, CaO—$Al_2O_3$—$SiO_2$—$B_2O_3$ based glass ceramics ($\varepsilon r=7$) is used. The combination in Example 2 cannot sufficiently decrease the stray capacitance. In the combination in Example 3, since the material of the variable capacitance layer and the material of the insulating element are different and, therefore, have different coefficients of thermal expansion, there is a possibility that reliability, in particular heat cycle resistance, is insufficient.

SUMMARY OF THE INVENTION

Preferred embodiments of the present invention provide variable capacitance elements having excellent heat cycle resistance even when the material of the variable capacitance layer and the material of the insulating layer are different from one another.

As a result of intensive studies to solve the above-described problems, the inventor of the present invention has discovered that by using an insulating material which contains at least Sr, and may further contain Ti and/or Zr, as the material of the insulating element, the problems described above are able to be solved, and has invented preferred embodiments of the present invention.

A first preferred embodiment of the present invention provides a variable capacitance element including a variable capacitance layer made of a dielectric material; an electrode that obtains electrostatic capacitance provided in the variable capacitance layer; insulating elements that face each other via the variable capacitance layer; and a lead element extending from the electrode; wherein the insulating element is made of an insulating material which contains at least Sr and which may preferably further contain Ti and/or Zr.

Preferred embodiments of the present invention provide variable capacitance elements having excellent heat cycle resistance by providing the insulating element made from the insulating material which contains at least Sr and which may preferably further contain Ti and/or Zr.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Variable capacitance elements according to preferred embodiments of the present invention will now be described in detail with reference to the drawings. However, shapes, arrangements, and other configurations of the variable capacitance element and constituent elements of the preferred embodiments of the present invention are not limited to the shown examples.

Figure 1:
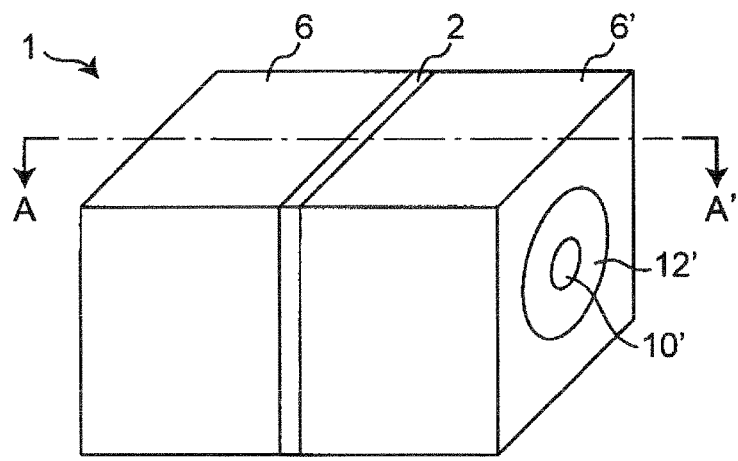
FIG. 1 is a schematic perspective view of a variable capacitance element according to a preferred embodiment of the present invention.
Figure 2:
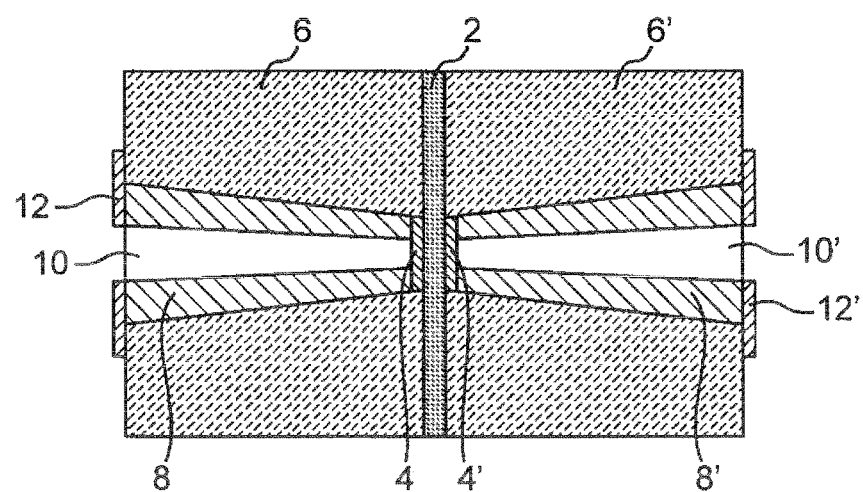
FIG. 2 is a schematic cross-sectional view taken along A-A' of the variable capacitance element according to the preferred embodiment of FIG. 1.

As shown in FIGS. 1 and 2, a variable capacitance element according to a preferred embodiment includes a variable capacitance layer 2, a pair of electrodes 4 and 4' that obtain electrostatic capacitance which are positioned to face each other via the variable capacitance layer, a pair of insulating elements 6 and 6' supporting the variable capacitance layer 2 therebetween, a pair of lead elements 8 and 8' electrically connected to the pair of the electrodes 4 and 4' and penetrating the insulating elements 6 and 6' and external electrodes 12 and 12'.

The variable capacitance layer 2 is preferably made of one or more dielectric materials. By adjusting the thickness of the dielectric materials, the capacitance of the variable capacitance element is able to be adjusted.

Examples of the dielectric materials are not particularly limited as long as the material is dielectric, and are preferably a ferroelectric material. By using the ferroelectric material, the capacitance and the capacitance variable rate of the variable capacitance element are able to be increased.

Examples of the ferroelectric materials are not particularly limited and include one or more ferroelectric materials selected from a sintered ceramic containing Ba, Sr, and Ti, a sintered ceramic containing Ba, Zr, and Ti, and a sintered ceramic containing Bi, Zn, and Nb. Such ferroelectric materials are known as $(BaSr)TiO_3$, $Ba(ZrTi)O_3$, and $(BiZn)Nb_2O_7$. By using such materials, the variable capacitance layer is obtained, which has high variable rate of $\varepsilon r$ when a direct voltage is applied.

The thickness of the variable capacitance layer is not particularly limited to, but is preferably, for example, about 0.5 μm or more and about 100 μm or less, more preferably about 1 μm or more and about 10 μm or less, and even more preferably about 1 μm or more and about 5 μm or less. The thickness of the variable capacitance layer is preferably about 10 μm or less from the viewpoint of increasing the capacitance of the variable capacitance element and is preferably about 1 μm or more to reliably ensure insulation.

In a variable capacitance element according to a preferred embodiment of the present invention, the pair of the electrodes 4 and 4' to obtain electrostatic capacitance face each other on both main surfaces of the variable capacitance layer 2. By changing an area of contact surfaces between the electrode and the variable capacitance layer, the capacitance of the variable capacitance element is able to be adjusted.

Although the electrodes 4 and 4' may be present at any position on the variable capacitance layer 2 in any size and shape as long as the electrodes face each other, the electrodes 4 and 4' preferably have the same or substantially the same size and the same or substantially the same shape and are arranged symmetrically relative to the variable capacitance layer, preferably at the center or approximate center of the variable capacitance layer.

Examples of the material used to make the electrode are not particularly limited as long as the material is electrically conductive, and include Ag, Cu, Pt, Ni, Al, Pd, Au, monel (Ni—Cu alloy), and other suitable materials. Particularly, Ag or Cu is preferable because of a low conductive loss at high frequency.

A thickness of the electrodes is not particularly limited and is preferably, for example, about 0.5 μm or more. By setting the thickness of the electrode to about 0.5 μm or more, resistance is further reduced and a skin depth is ensured.

In the variable capacitance element 1 according to the present preferred embodiment, the pair of the lead elements 8 and 8' are respectively connected to the electrodes 4 and 4' and are arranged inside the pair of the insulating elements 6 and 6'. The lead elements are structured and function to extend the electrodes to the outside of the variable capacitance element.

The pair of the lead elements 8 and 8' preferably are provided on a same axis perpendicular or substantially perpendicular to the variable capacitance layer 2. "Perpendicular or substantially perpendicular to the variable capacitance layer" means that an angle defined by the axis relative to the variable capacitance layer is substantially 90°, for example, 80° or more and 90° or less, preferably 85° or more and 90° or less, more preferably 88° or more and 90° or less. Such arrangement enables a reduction in a stray capacitance.

Examples of a material used to make the lead elements are not particularly limited as long as the material is electrically conductive, and include Ag, Cu, Pt, Ni, Al, Pd, Au, monel (Ni—Cu alloy), and other suitable materials. Particularly, Ag or Cu is preferable because of a low conductive loss at high frequency.

Preferably, each of the lead elements is made of the same material as that of the respective electrode and is integrally provided with the respective electrode. That is, in the present preferred embodiment, although the electrode 4 and the lead element 8, as well as the electrode 4' and the lead element 8' are shown as different members, respectively, they are preferably integrally provided as one single member.

A shape of the lead elements is not particularly limited and may be, for example, a circular column shape, a truncated cone shape, a rectangular column shape, a truncated pyramid shape, or a hollow body thereof, for example, a hollow circular column shape or a hollow truncated cone shape. To facilitate production thereof, the shape is preferably a hollow or solid circular column or truncated cone shape. An axial length of the lead elements is not particularly limited and may be appropriately selected in accordance with a desired element size.

A thickness of the lead element is not particularly limited as long as the skin depth is able to be ensured.

In the variable capacitance element 1 of the present preferred embodiment, the insulating elements 6 and 6' are positioned to face each other via the variable capacitance layer 2, and include the through-holes 10 and 10'. The lead elements 8 and 8' are disposed inside the through-holes 10 and 10'. The pair of the insulating elements may support the variable capacitance layer therebetween via the pair of electrodes.

The pair of the insulating elements are arranged such that the through-holes thereof are arranged on the same axis perpendicular or substantially perpendicular to the variable capacitance layer and the electrodes are disposed at ends of the through-holes on the variable capacitance layer side. The size of the electrodes may be the same as or different from that of openings of the through-holes. The shape of the through-holes may be appropriately selected in accordance with the shape of the lead elements penetrating therethrough.

The material used to make the insulating element is preferably a material having lower permittivity than and coefficient of thermal expansion near to the material used to make variable capacitance layer. The material used to make the variable capacitance layer is preferably BST: (Ba,Sr)

$TiO_3$ or BZT: $Ba(Zr,Ti)O_3$. The inventor of preferred embodiments of the present invention has noted that since $SrTiO_3$—$SrZrO_3$ based material is able form a solid solution in the entire area, the permittivity and the coefficient of thermal expansion thereof is able to be sequentially adjusted by suitably selecting a composition, and has discovered that a $SrTiO_3$—$SrZrO_3$ based material is a suitable material for BST and BZT having any composition. By using the $SrTiO_3$—$SrZrO_3$ based material, heat cycle resistance of the variable capacitance element is increased.

That is, the material used to make the insulating element is a material which contains at least Sr and which may further contain Ti and/or Zr. The insulating material is preferably a Perovskite inorganic material, for example.

In a preferred embodiment of the present invention, the material used to make the insulating element may preferably be an insulating material containing Sr and Ti.

In another preferred embodiment of the present invention, the material used to make the insulating element may preferably be an insulating material containing Sr and Zr.

In still another preferred embodiment of the present invention, the material used to make the insulating element may preferably be an insulating material containing Sr, Ti and Zr.

In a preferred embodiment of the present invention, the proportion by mole of Zr is about 0.20 or more and about 1.0 or less, preferably about 0.25 or more and about 1.0 or less, and more preferably about 0.50 or more and about 1.0 or less with respect to the total amount by mole of Ti and Zr in the insulating element. It is noted that in this preferred embodiment, Ti is an optional component, when the proportion by mole of Zr is about 1.0 with respect to the total amount by mole of Ti and Zr, Ti is absent in the insulating element. By setting the composition to such proportions, the relative permittivity of the insulating element becomes about 150 or less, thus, stray capacitance is able to be decreased.

In another preferred embodiment, the proportion by mole of Zr is preferably about 0 or more and about 0.75 or less, and more preferably about 0 or more and about 0.50 or less with respect to the total amount by mole of Ti and Zr in the insulating element. It is noted that in this preferred embodiment, Zr is an optional component, when the proportion by mole of Zr is 0 with respect to the total amount by mole of Ti and Zr, Zr is absent in the insulating element.

In still another preferred embodiment, the proportion by mole of Zr is preferably about 0.25 or more and about 0.75 or less, and more preferably about 0.50 or more and about 0.75 or less with respect to the total amount by mole of Ti and Zr in the insulating element, for example.

A relative permittivity of the material used to make the insulating element is not particularly limited, but is preferably about 500 or less, more preferably about 300 or less, and even more preferably about 100 or less, and still more preferably about 30 or less, for example.

A thickness of the insulating element (thickness in a direction perpendicular or substantially perpendicular to the variable capacitance layer) is not particularly limited and may be appropriately selected depending on a desired element size.

The variable capacitance element 1 includes an external electrode 12 on surfaces of the insulating elements opposite to the surfaces supporting the variable capacitance layer. Although the external electrode is preferably provided in this preferred embodiment, the external electrode is not an essential element and the lead element may be directly connected to external lines without providing the external electrode.

Examples of a material used to make the external electrodes are not particularly limited as long as the material is electrically conductive, and include Ag, Cu, Pt, Ni, Al, Pd, Au, monel (Ni—Cu alloy), and other suitable materials. Preferably, the same material as that of the electrode and the lead element is used.

For example, the variable capacitance element 1 according to a preferred embodiment described above is produced as follows.

First, the variable capacitance layer is made of a dielectric material.

The dielectric material is molded into a sheet shape to form a dielectric sheet. For example, the dielectric material is mixed/kneaded with an organic vehicle containing a binder resin and an organic solvent and molded into a sheet shape to form the dielectric sheet; although preferred embodiments of the present invention are not limited thereto. A plurality of the dielectric sheets is laminated and pressure-bonded to obtain the variable capacitance layer. One dielectric sheet may be used as the variable capacitance layer.

Next, the insulating element is formed using an insulating material.

For example, when the insulating material is a ceramic material, the ceramic material may be mixed/kneaded with an organic vehicle containing a binder resin and an organic solvent and molded into a sheet shape to obtain ceramic sheets as is the case of forming of the variable capacitance layer. The ceramic sheets are laminated to a desired thickness and pressure-bonded to obtain a laminated body of the ceramic sheets (hereinafter also referred to as a ceramic laminated body). Subsequently, the through-holes for forming the lead elements are formed in the ceramic laminated body to obtain the insulating elements. A method or device used to form the through-holes is not particularly limited and, for example, the through-holes may be formed using a laser or a mechanical punch. The formed through-holes may preferably be filled with, for example, a carbon paste so as to prevent deformation during pressure bonding.

Then, the ceramic laminated body, the variable capacitance layer, and the other ceramic laminated body are laminated in this order such that the through-holes of the two ceramic laminated bodies are provided on the same axis, and are pressure-bonded to obtain a laminated body.

Then, the obtained laminated body is sintered. A conductive material is filled as a conductive paste, for example, a silver paste, into the through-holes so as to form the electrodes and the lead elements, and the conductive paste is also applied to the surfaces exposing the through-holes so as to form the external electrodes, then the laminated body is sintered again, or films of the conductive material are formed inside the through-holes and on external electrode formation portions by a sputtering method, for example.

The variable capacitance element 1 of this preferred embodiment is preferably produced as described above, for example.

The method of producing the variable capacitance element 1 according to a preferred embodiment of the present invention is not limited to the preferred embodiments and may be variously altered.

For example, when the ceramic laminated body is formed, the through-holes are formed after the laminated body is obtained in the above-described preferred embodiment; although preferred embodiments of the present invention are not limited thereto. For example, a ceramic paste may be printed and laminated while the through-holes are formed by a photolithography method.

Although the electrodes and the lead elements preferably are formed after the variable capacitance layer and the insulating elements are sintered in the above-described preferred embodiment, for example, the entire element may be co-sintered after the conductive paste is filled while laminating the ceramic sheets; the conductive paste is filled into the through-holes before laminating the variable capacitance layer and the ceramic laminated bodies; or the conductive paste is filled after laminating the variable capacitance layer and the ceramic laminated bodies and before sintering.

Alternatively, after the conductive paste for forming the electrodes is applied onto the main surfaces of the variable capacitance layer and the insulating elements are then laminated, the conductive paste may be filled into the through-holes.

Preferably, as in the above-described preferred embodiment, after the variable capacitance layer and the insulating elements are sintered, the conductive paste is sintered to form the electrodes and the lead elements. By performing the sintering separately in this way, a metal having a melting point that is lower than the sintering temperature of the variable capacitance layer and the insulating elements, for example, Ag or Cu, is able to be used as the material of the electrode and the lead element.

Although a preferred embodiment of the present invention has been described, the present invention is not limited to this preferred embodiment and may be variously altered.

Figure 3:
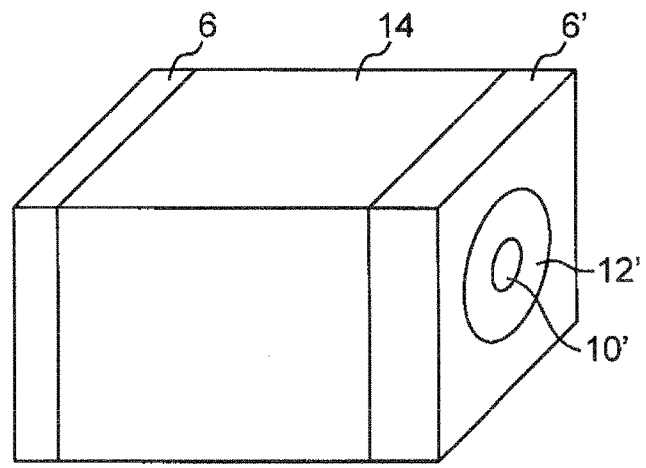
FIG. 3 is a schematic perspective view of the variable capacitance element according to another preferred embodiment of the present invention.

For example, as shown in FIG. 3, a variable capacitance element according to a preferred embodiment of the present invention may preferably include a conducting portion 14 on at least one of the surfaces perpendicular or substantially perpendicular to the main surfaces of the variable capacitance layer. By providing such a conducting portion, a radiation loss of an electromagnetic wave is reduced.

The variable capacitance element according to a preferred embodiment of the present invention includes a plurality of variable capacitance layers made of a dielectric material; a plurality of pairs of electrodes located on both main surfaces of the variable capacitance layers that face each other via the variable capacitance layers; a plurality of insulating elements; and at least one pair of lead elements, wherein the plurality of variable capacitance layers and the plurality of insulating elements are alternately laminated to provide a laminated body, the plurality of variable capacitance layers and the plurality of pairs of electrodes define a plurality of capacitor structures, and the lead element is electrically connected at one end thereof to the electrode defining the capacitor structures, penetrates the insulating element, and is electrically connected at the other end to external electrode or other electrical elements.

Figure 4:
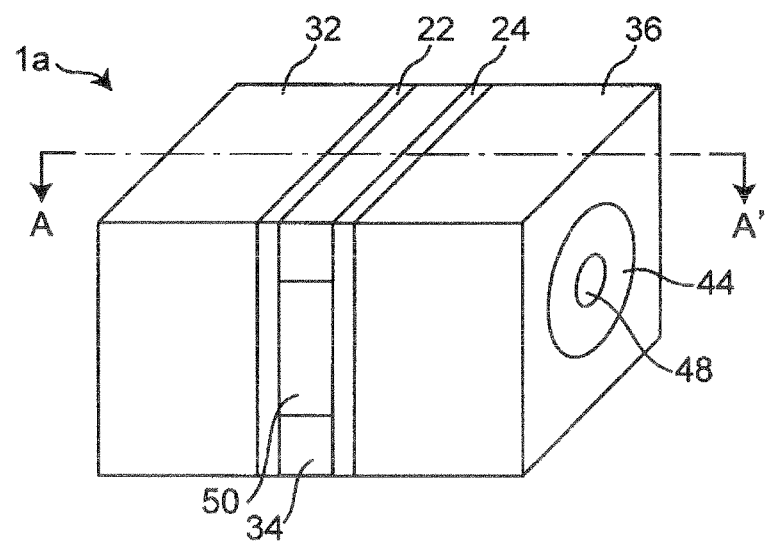
FIG. 4 is a schematic perspective view of a variable capacitance element 1a according to a preferred embodiment of the present invention.
Figure 5:
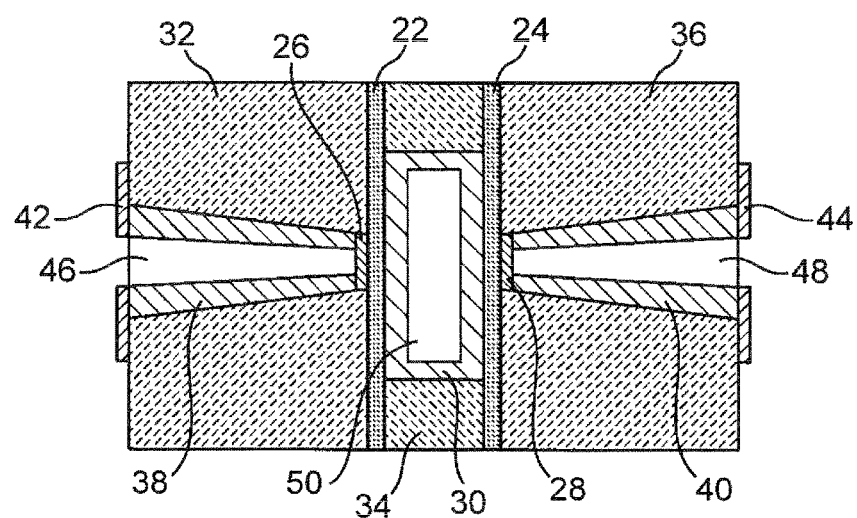
FIG. 5 is a schematic cross-sectional view taken along A-A' of the variable capacitance element 1a according to the preferred embodiment of FIG. 4.

In another preferred embodiment of the present invention, as shown in FIGS. 4 and 5, a variable capacitance element 1a includes variable capacitance layers 22 and 24, electrodes 26, 28, and 30, insulating elements 32, 34, and 36, lead-out elements 38 and 40, and external electrodes 42 and 44. The variable capacitance layers and the insulating elements are laminated in order of the insulating element 32, the variable capacitance layer 22, the insulating element 34, the variable capacitance layer 24, and the insulating element 36. The electrodes 26 and 30 are located opposite to each other across the variable capacitance layer 22 to define one capacitor structure. The electrodes 28 and are located opposite to each other across the variable capacitance layer 24 to define another capacitor structure. These capacitor structures are electrically arranged in series. The electrode 26 is electrically connected to one end of the lead-out element 38 provided in a via hole 46 penetrating the insulating element 32, and the other end of the lead-out element 38 is electrically connected to the external electrode 42. Similarly, the electrode 28 is electrically connected to one end of the lead-out element 40 provided in a via hole 48 penetrating the insulating element 36, and the other end of the lead-out element 40 is electrically connected to the external electrode 44. The electrode 30 is located in an opening 50 provided in the insulating element 34, and defines and functions as both electrodes in the capacitor structure including the variable capacitance layer 22 and the capacitor structure including the variable capacitance layer 24.

Figure 6:
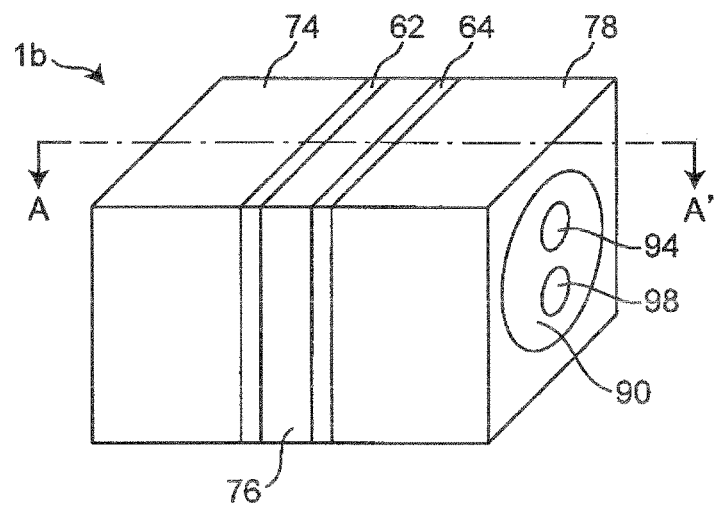
FIG. 6 is a schematic perspective view of the variable capacitance element 1b according to another preferred embodiment of the present invention.
Figure 7:
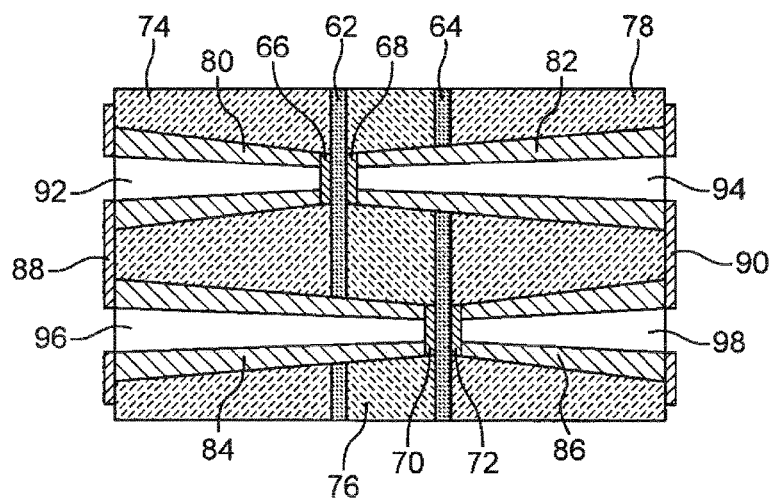
FIG. 7 is a schematic cross-sectional view taken along A-A' of the variable capacitance element 1b according to the preferred embodiment of FIG. 6.

In another preferred embodiment of the present invention, as shown in FIGS. 6 and 7, the variable capacitance element includes variable capacitance layers 62 and 64, electrodes 66, 68, 70, and 72, insulating elements 74, 76, and 78, lead-out elements 80, 82, 84, and 86, and external electrodes 88 and 90. The variable capacitance layers and the insulating elements are laminated in order of the insulating element 74, the variable capacitance layer 62, the insulating element 76, the variable capacitance layer 64, and the insulating element 78. The electrodes 66 and 68 are located opposite to each other across the variable capacitance layer 62 to define one capacitor structure. The electrodes 70 and are located opposite to each other across the variable capacitance layer 64 to define another capacitor structure. These capacitor structures are electrically connected in parallel. The electrode 66 is electrically connected to one end of the lead-out element 80 provided in a via hole 92 penetrating the insulating element 74, and the other end of the lead-out element 80 is electrically connected to the external electrode 88. Similarly, the electrode 68 is electrically connected to one end of the lead-out element 82 provided in a via hole 94 penetrating the insulating elements 76 and 78 as well as the variable capacitance layer 64, and the other end of the lead-out element 82 is electrically connected to the external electrode 90. The electrode 70 is electrically connected to one end of the lead-out element 84 provided in a via hole 96 penetrating the insulating elements 74 and 76 as well as the variable capacitance layer 62, and the other end of the lead-out element 84 is electrically connected to the external electrode 88. Similarly, the electrode 72 is electrically connected to one end of the lead-out element 86 provided in a via hole 98 penetrating the insulating element 78, and the other end of the lead-out element 86 is electrically connected to the external electrode 90.

Example 1

$BaCO_3$, $SrCO_3$, $ZrO_2$, and $TiO_2$ powders were prepared and weighed to achieve the respective composition ratios of $(Ba_{0.7}Sr_{0.3})TiO_3$ (Sample number 1) and $Ba(Zr_{0.75}Ti_{0.25})O_3$ (Sample number 2). Each of the weighed materials was placed in a ball mill, mixed and pulverized in a wet state for about 16 hours, dried, and then calcined at a temperature of about 1200° C. for about two hours. Thereafter, the obtained calcined material was placed in a ball mill again and pulverized in a wet state for about 16 hours, a binder and a plasticizer were added, and the material is formed into a sheet shape having a thickness of about 30 μm by a doctor blade method. After the obtained sheet was punched out into a predetermined size, a plurality of sheets were laminated such that the thickness after calcination is about 1 mm and press-bonded. The press-bonded laminated body was punched out into a disk shape having a diameter of about 10 mm after calcination. Then, these were placed in a calcining furnace to remove the binder and the plasticizer at the temperature of about 400° C., and the temperature was raised to about 1350° C. and maintained for two hours for calcining.

The laminated body press-bonded in the same way was punched out into a square plate shape having a width of about 5 mm and a height of about 10 mm. Then, these samples were placed in a calcining furnace to remove the binder and the plasticizer at the temperature of about 400° C., and the temperature was raised to about 1350° C. and kept for about two hours for calcining.

The disk-shaped samples were applied with an Ag paste and heat-treated at about 750° C. to form the electrodes. For 30 samples on which the electrodes were formed, electrostatic capacitance was measured using an Impedance Analyzer (manufactured by Agilent Technologies Japan, Ltd.): HP4294A) and applying alternating voltage having a voltage of about 1 Vrms and a frequency of about 1 kHz at a temperature of about 25±2° C., and calculated the average value. Relative permittivity εr was calculated based on the obtained average value of the electrostatic capacitance and a dimension of the disk-shaped sample.

For the square plate shaped samples, the coefficient of thermal expansion from a room temperature to about 1100° C. was measured by using TMA (Thermo Mechanical Analysis).

The results of the measurement are shown in Table 1 (Sample numbers 1 and 2).

Example 2

$SrCO_3$, $TiO_2$, and $ZrO_2$ powders were prepared and weighed to achieve the respective composition ratios of $Sr(Ti_{1-x}Zr_x)O_3$ (x is 0 (Sample number 3), 0.25 (Sample number 4), 0.5 (Sample number 5), and 0.75 (Sample number 6), and 1.0 (Sample number 7)). Each of the weighed materials was placed in a ball mill, mixed and pulverized in a wet state for about 16 hours, dried, and then calcined at a temperature of about 1200° C. for about two hours. Thereafter, the obtained calcined material was placed in a ball mill again and pulverized in a wet state for about 16 hours, a binder and a plasticizer were added, and the material was formed into a sheet shape having a thickness of about 30 μm by a doctor blade method. After the obtained sheet was punched out into a predetermined size, a plurality of sheets were laminated such that the thickness after calcination is about 1 mm and press-bonded.

Similarly to Example 1, samples (disk-shaped, and square plate-shaped) were produced from the laminated body press-bonded, and the relative permittivity εr and the coefficient of thermal expansion were measured. The results are shown in Table 1 (Sample numbers 3-7).

As a comparative example, a sample was produced similarly to the above by using a $CaO-Al_2O_3-SiO_2-B_2O_3$ based glass, and the relative permittivity εr and the coefficient of thermal expansion were measured. The results are shown in Table 1 (Sample number 8).

TABLE 1

| Sample number | Application | Composition | Relative permittivity εr (—) | Coefficient of thermal expansion ($\times 10^{-6}$/° C.) |
|---|---|---|---|---|
| 1 | Variable capacitance layer | $(Ba_{0.7}Sr_{0.3})TiO_3$ | 7600 | 11.8 |
| 2 | | $Ba(Zr_{0.75}Ti_{0.25})O_3$ | 3700 | 11.1 |
| 3 | Insulating element | $SrTiO_3$ | 300 | 11.6 |
| 4 | | $Sr(Ti_{0.75}Zr_{0.25})O_3$ | 128 | 11.4 |
| 5 | | $Sr(Ti_{0.5}Zr_{0.5})O_3$ | 73 | 11.2 |
| 6 | | $Sr(Ti_{0.25}Zr_{0.75})O_3$ | 62 | 11.0 |
| 7 | | $SrZrO_3$ | 38 | 10.5 |
| 8 | | $CaO-Al_2O_3-SiO_2-B_2O_3$ based glass | 7.7 | 5.5 |

Figure 8:
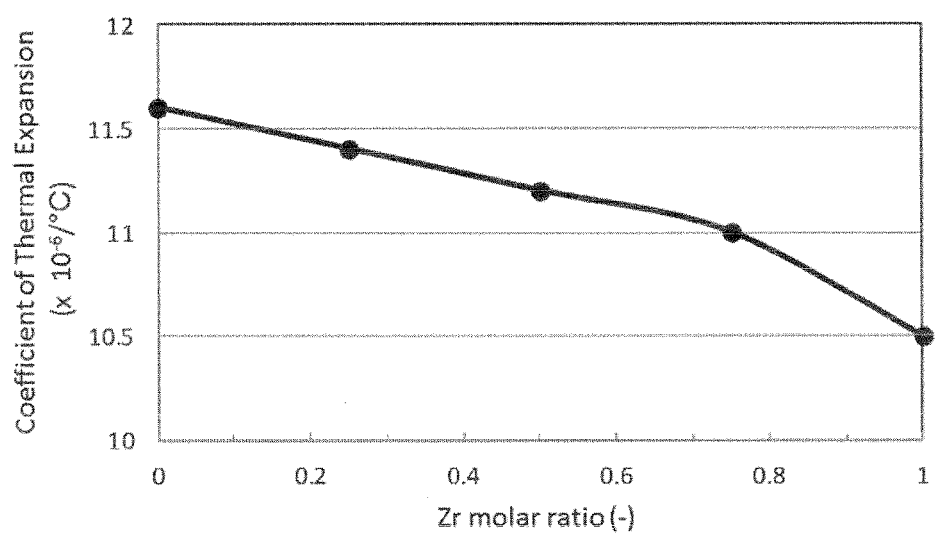
FIG. 8 is a graph showing a relationship between x (Zr molar ratio) and coefficient of thermal expansion in the samples of Examples.
Figure 9:
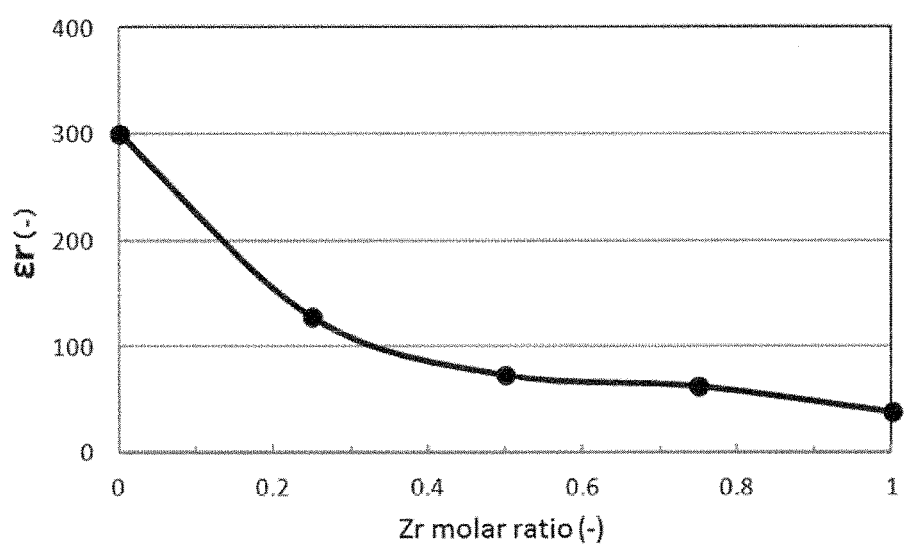
FIG. 9 is a graph showing a relationship between x (Zr molar ratio) and relative permittivity $\varepsilon r$ in the samples of Examples.

The relationship between x (x is a molar ratio of Zr when the total males of Ti and Zr is 1) and the coefficient of thermal expansion is shown in FIG. 8. The relationship between x and the relative permittivity εr is shown in FIG. 9. As seen from FIGS. 8 and 9, since the permittivity and the coefficient of thermal expansion is able to be sequentially adjusted by selecting a composition, the composition is able to be selected depending on the material of the variable capacitance layer.

Example 3

The variable capacitance element shown in FIGS. 1 and 2 was produced using the sheets for the variable capacitance layer which were produced in Examples 1 and 2 (Sample numbers 1 and 2) and the sheets for the insulating element (Sample numbers 3-8) as follows.

Twenty sheets punched out into a predetermined size for the insulating element were laminated and temporarily press-bonded. Then, a via hole was formed in the obtained laminated body by a laser and a carbon paste was filled into the via hole. One sheet for the variable capacitance layer was sandwiched between two laminated bodies, and they were laminated such that the vias formed in two laminated bodies are overlapped, press-bonded at about 100 MPa and press-bonded by a warm isostatic press (WIP) at about 60° C. and about 200 MPa to obtain a laminated body. Then, the obtained laminated body was cut into individual pieces using a dicer (the length L=about 1.0 mm, the width W=about 0.5 mm, and the height T=about 0.5 mm). The binder and the plasticizer were removed at the temperature of about 400° C. Then, the temperature of the laminated bodies was raised to about 1350° C. and maintained for about two hours for calcining. Then an Ag paste was filled in the via hole, and the same Ag paste was applied to portion of exposed via so as to form external electrode, the calcination was performed at about 750° C. to obtain samples of the variable capacitance element (Sample numbers 11-22) shown in FIGS. 1 and 2. It is noted that the combination of the material for the variable capacitance layer and the material for the insulating element are shown in Table 2.

For 30 samples of the variable capacitance element in each of Sample numbers 11-22, a heat cycle test was performed, in which a cycle cooling the sample to about −55° C. at a decreasing rate of about 10° C./sec, remaining at this temperature for about 30 minutes, and then heating the sample to about 150° C. at about 10° C./second, and remaining at this temperature for about 30 minutes was repeated 1000 cycles. For 30 samples after testing, the appearance of the samples was observed by light microscopy and presence or absence of crack was evaluated by counting the number of samples in which a crack occurs. The results are shown in Table 2. It is noted that Sample numbers 16 and 22 with "*" are comparative examples.

TABLE 2

| Sample number | For variable capacitance layer | For insulating element | Result of heat cycle test |
|---|---|---|---|
| 11 | $(Ba_{0.7}Sr_{0.3})TiO_3$ | $SrTiO_3$ | 0/30 |
| 12 | $(Ba_{0.7}Sr_{0.3})TiO_3$ | $Sr(Ti_{0.75}Zr_{0.25})O_3$ | 0/30 |
| 13 | $(Ba_{0.7}Sr_{0.3})TiO_3$ | $Sr(Ti_{0.5}Zr_{0.5})O_3$ | 0/30 |
| 14 | $(Ba_{0.7}Sr_{0.3})TiO_3$ | $Sr(Ti_{0.25}Zr_{0.75})O_3$ | 0/30 |
| 15 | $(Ba_{0.7}Sr_{0.3})TiO_3$ | $SrZrO_3$ | 0/30 |
| *16 | $(Ba_{0.7}Sr_{0.3})TiO_3$ | $CaO—Al_2O_3—SiO_2—B_2O_3$ based glass | 8/30 |
| 17 | $Ba(Zr_{0.75}Ti_{0.25})O_3$ | $SrTiO_3$ | 0/30 |
| 18 | $Ba(Zr_{0.75}Ti_{0.25})O_3$ | $Sr(Ti_{0.75}Zr_{0.25})O_3$ | 0/30 |
| 19 | $Ba(Zr_{0.75}Ti_{0.25})O_3$ | $Sr(Ti_{0.5}Zr_{0.5})O_3$ | 0/30 |
| 20 | $Ba(Zr_{0.75}Ti_{0.25})O_3$ | $Sr(Ti_{0.25}Zr_{0.75})O_3$ | 0/30 |
| 21 | $Ba(Zr_{0.75}Ti_{0.25})O_3$ | $SrZrO_3$ | 0/30 |
| *22 | $Ba(Zr_{0.75}Ti_{0.25})O_3$ | $CaO—Al_2O_3—SiO_2—B_2O_3$ based glass | 5/30 |

For samples which were the variable capacitance elements according to preferred embodiments of the present invention (Sample numbers 11-15 and 17-22), no occurrence of cracks was observed. This effect was achieved by making the coefficient of thermal expansion of the insulating element close to the coefficient of thermal expansion of the variable capacitance element.

The protection elements according to preferred embodiments of the present invention are usable in various electronic devices, such as an RFID (radio frequency identification) system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A variable capacitance element comprising:
a variable capacitance layer made of a dielectric material;
a pair of electrodes that face each other via the variable capacitance layer;
a pair of insulating elements supporting the variable capacitance layer therebetween; and
a pair of lead elements respectively connected to the pair of electrodes; wherein
the pair of lead elements are respectively disposed inside the pair of insulating elements, and the pair of lead elements are on a same axis perpendicular or substantially perpendicular to the variable capacitance layer.

2. The variable capacitance element according to claim 1, wherein each of the pair of insulating elements is made of an insulating material which contains Sr and at least one of Ti and Zr.

3. The variable capacitance element according to claim 2, wherein a proportion by mole of Zr is about 0.25 or more and about 1.0 or less with respect to a total amount by mole of Ti and Zr in the pair of insulating elements.

4. The variable capacitance element according to claim 2, wherein a proportion by mole of Zr is about 0.25 or more and about 0.75 or less with respect to a total amount by mole of Ti and Zr in the pair of insulating elements.

5. The variable capacitance element according to claim 2, wherein the variable capacitance layer includes an insulating material containing at least one of Ba and Sr and at least one of Ti and Zr.

6. The variable capacitance element according to claim 1, wherein the pair of electrodes and the pair of lead elements are made of Ag or Cu.

7. The variable capacitance element according to claim 1, wherein each of the pair of lead elements and each of the pair of electrodes are made of a same material and one of the pair of lead elements and a respective one of the pair of electrodes are integrally provided as a single element.

8. A variable capacitance element comprising:
a plurality of variable capacitance layers made of a dielectric material;
a plurality of pairs of electrodes located on both main surfaces of the variable capacitance layers that face each other via the variable capacitance layers;
a plurality of insulating elements; and
at least one pair of lead elements; wherein
the plurality of variable capacitance layers and the plurality of insulating elements are alternately laminated to provide a laminated body;
the plurality of variable capacitance layers and the plurality of pairs of electrodes define a plurality of capacitor structures;
the lead elements are electrically connected at one end thereof to a respective electrode defining the capacitor structures, penetrate the insulating elements, and are electrically connected at another end to external electrodes or other electrical elements; and
each of the plurality of insulating elements is made of an insulating material which contains Sr and at least one of Ti and Zr.

9. The variable capacitance element according to claim 8, wherein each of the pair of insulating elements is made of an insulating material which contains Sr and at least one of Ti and Zr.

10. The variable capacitance element according to claim 9, wherein a proportion by mole of Zr is about 0.25 or more and about 1.0 or less with respect to the total amount by mole of Ti and Zr in the pair of insulating elements.

11. The variable capacitance element according to claim 9, wherein a proportion by mole of Zr is about 0.25 or more and about 0.75 or less with respect to the total amount by mole of Ti and Zr in the pair of insulating elements.

12. The variable capacitance element according to claim 9, wherein each of the plurality of variable capacitance layers includes an insulating material containing at least one of Ba and Sr and at least one of Ti and Zr.

13. The variable capacitance element according to claim 8, wherein the plurality of pairs of electrodes and the at least one pair of lead elements are made of Ag or Cu.

14. The variable capacitance element according to claim 8, wherein each of the at least one pair of lead elements and each of the plurality of pairs of electrodes are made of the same material and one of the at least one pair of lead elements and a respective one of the plurality of pairs of electrodes are integrally provided as a single element.

* * * * *